US009290352B2

(12) United States Patent
Honegger

(10) Patent No.: US 9,290,352 B2
(45) Date of Patent: Mar. 22, 2016

(54) METHOD AND A DEVICE FOR CREATING A PRODUCT STREAM OF PRODUCT UNITS IN A PREDEFINED SEQUENCE

(71) Applicant: Ferag AG, Hinwil (CH)

(72) Inventor: Werner Honegger, Bach (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 14/395,702

(22) PCT Filed: Mar. 14, 2013

(86) PCT No.: PCT/CH2013/000045

§ 371 (c)(1),
(2) Date: Oct. 20, 2014

(87) PCT Pub. No.: WO2013/159238

PCT Pub. Date: Oct. 31, 2013

(65) Prior Publication Data

US 2015/0114797 A1 Apr. 30, 2015

(30) Foreign Application Priority Data

Apr. 25, 2012 (CH) ........................................ 570/12

(51) Int. Cl.

*B65G 47/06* (2006.01)
*B65G 47/36* (2006.01)
*B65H 29/00* (2006.01)
*B65H 29/62* (2006.01)

(Continued)

(52) U.S. Cl.

CPC .............. *B65H 29/003* (2013.01); *B65H 29/00* (2013.01); *B65H 29/62* (2013.01); *B65H 39/055* (2013.01); *B65H 43/04* (2013.01); *B42C 1/00* (2013.01); *B65H 2301/437* (2013.01); *B65H 2301/4311* (2013.01); *B65H 2301/4473* (2013.01); *B65H 2301/4474* (2013.01); *B65H 2301/44712* (2013.01); *B65H 2701/1932* (2013.01)

(58) Field of Classification Search

CPC ....... B65H 43/02; B65H 39/043; B65G 47/06
USPC ............ 198/418.1, 418.2, 418.3, 468.2, 617; 270/52.04, 52.06, 58.23; 271/3.06, 271/9.01

See application file for complete search history.

(56) References Cited

U.S. PATENT DOCUMENTS 4,317,203 A * 2/1982 Botte et al. ...................... 714/51
5,098,076 A 3/1992 Kelsey (Continued)

FOREIGN PATENT DOCUMENTS

EP 0 631 960 1/1995
WO 01/12535 2/2001

*Primary Examiner* — Douglas Hess
(74) *Attorney, Agent, or Firm* — Rankin, Hill & Clark LLP

(57) ABSTRACT

A method and a device for creating a product stream of product units in a predefined sequence. The device includes a first conveying device with a grouping stretch for creating a cycled product stream of product units from fed products, in a predefined sequence. The device also includes a conveying-away device for conveying away the product units in the predefined sequence in a cycled product stream. The device further includes a bridging device that is designed such that product units amid the bridging of a conveying stretch section of the conveying-away device can be fed to the conveying-away device in a temporally successive manner and thus be sorted into the predefined sequence of product units.

15 Claims, 3 Drawing Sheets

(51) Int. Cl.

| | |
|---|---|
| ***B65H 39/055*** | (2006.01) |
| ***B65H 43/04*** | (2006.01) |
| *B42C 1/00* | (2006.01) |

(56) References Cited

U.S. PATENT DOCUMENTS

| | | | | |
|---|---|---|---|---|
| 5,267,821 | A | 12/1993 | Bodart et al. | |
| 5,326,209 | A | 7/1994 | Duke | |
| 5,547,177 | A | 8/1996 | Merkli et al. | |
| 6,152,439 | A * | 11/2000 | Hirayama et al. | 270/52.04 |
| 6,311,827 | B1 * | 11/2001 | Draghetti | 198/418.1 |
| 6,321,135 | B1 * | 11/2001 | Asgeirsson | 700/213 |
| 6,707,563 | B1 * | 3/2004 | Barry et al. | 358/1.14 |
| 7,059,478 | B2 * | 6/2006 | Spatafora | 209/535 |
| 7,547,008 | B2 * | 6/2009 | Belanger | 270/52.15 |
| 7,665,720 | B2 * | 2/2010 | Mori et al. | 270/52.16 |
| 7,810,300 | B2 * | 10/2010 | Monti | 53/151 |
| 7,845,485 | B2 * | 12/2010 | Honegger | 198/418.2 |
| 7,900,901 | B2 * | 3/2011 | Abegglen | 270/52.16 |
| 8,419,004 | B2 * | 4/2013 | Stauber | 270/52.14 |
| 8,919,758 | B2 * | 12/2014 | Mueller | 270/52.02 |
| 2004/0265095 | A1 | 12/2004 | Blohm et al. | |

* cited by examiner

METHOD AND A DEVICE FOR CREATING A PRODUCT STREAM OF PRODUCT UNITS IN A PREDEFINED SEQUENCE

BACKGROUND OF THE INVENTION

1. Field of the Invention

The invention lies in the field of conveying and processing technology of flat products, in particular printed products, and relates to a method and to a device for creating a cycled product stream of product units in a predefined sequence.

2. Description of Related Art

The creation of a product stream, also called conveying stream, from flat product units in a predefined sequence or succession in particular serves for the purpose of the further processing in this predefined sequence. A predefined sequence according to definition represents a sorted succession of product units.

A preferred application lies in mailroom technology on composing and, as the case may be, addressing product units in a predefined sequence according to a predefined sequence of addresses, which for example corresponds to a mailing route. The mailing route represents the route that the deliverer goes on or travels when delivering the product units.

In mailroom technology, different products must be sorted according to addressees, composed and aggregated into groups, the so-called product units. Such product units can, e.g., be present as small stacks or as collections. The product units as a result can be product compositions. The background to this is the fact that as a rule, each addressee receives an individual composition of different products, wherein the different products of a product unit can be personalised, e.g. addressed.

The products of a product unit can be present in the form of letters or addressed printed products such as magazines, newspapers or advertising supplements. Moreover, individual or all products, such as e.g. letters, journals, cards or booklets of a product unit that are envisaged for a certain addressee can also be individualised with the address concerned before or during the composition of a product unit.

Moreover, the product unit can also comprise products that are not addressed, but are matched to the personal preferences of the addressee. These can be newspapers, magazines or advertising supplements.

The addressees as a rule are sought by the deliverer in a predefined sequence, which, e.g., corresponds to the mailing route. For this reason, it is important for the product units to also be made available for delivery in the sequence of the delivery or mailing route.

Therefore, there exits the need for the complete product stream of product units, also called product stream, to be created in the predefined sequence already on producing the production units. This sequence should also be retained with subsequent further processing steps and conveying steps.

A further processing can be the addressing of all or of selected products or the addressing of an envelope, which aggregates the product unit. Moreover, the further processing can also include packaging of the product units, e.g. into an envelope or into a protective covering of plastic.

The addresses, for example, are printed onto the product units in accordance with the sequence, in a printer that is arranged downstream of the sequence creation in the conveying direction. The products can subsequently likewise be conveyed in accordance with the sequence according to a predefined mailing or delivery route (sequence of the recipients) to a delivery device, from which the product units are delivered.

The above embodiments are to be considered as part of the disclosure of the invention.

It can occur that a product unit contrary to the setting or instructions is not formed or only in a faulty manner. Thus, for example, products that were not delivered for various reasons can be absent in a faulty product unit. Moreover, it can also be the case that the product unit comprises damage products.

A missing or faulty product unit must be corrected at a later stage (belatedly) or be created afresh, before this can be provided for the dispatch or for the further processing. A correction of the product unit, amongst other things, means that the product unit is completed by way of feeding the missing products, that the faulty products are exchanged or that excess products are discharged.

The creation or completion of the missing or faulty product unit at a later stage, however, leads to the fact that this is no longer at the correct place in the sequence, which has been created in the meantime, and which is conveyed further in the device.

Since one wishes to retain the predefined succession of the sequence of product units under all circumstances, the further conveying of the product units of the sequence that are correctly composed straightaway must be stopped in the device and the continuous creation of product units must be interrupted, for the belated creation or completion of the one product unit.

The belatedly correctly created product unit is then introduced into the sequence at the correct location. The further conveying of the sequence and, thus, the creation of further subsequent product units can be resumed again.

As an alternative to this method, the sequence section concerned can also be led into a waiting loop and be fed to the further conveying again only after completion by the mentioned product unit. Here too, however, the creation of subsequent product units is interrupted until the sequence section concerned is completed and can be conveyed further.

Thus EP 2 107 023 A1 describes a method and a device for completing a sequence of product units given an occurrence of faulty product units. The solution to the problem which is disclosed in this publication document is based on leading back the product sequence along a closed circulating path to the grouping stretch, at which the product units were composed, and on completing the faulty product unit. The completed sequence is subsequently fed to a transfer device for the transfer to a conveying-away unit.

Although a transfer of a predefined sequence to a conveying-away device is ensured with this method, the manufacturing of subsequent product units subsequently to the faulty product unit must, however, be interrupted until the faulty product unit has again been led through the grouping stretch and completed.

The procedure described above therefore leads to many production interruptions. The performance or efficiency of the device is significantly reduced. The device in the most unfavourable case does not achieve the required throughput of product units per time unit.

U.S. Pat. No. 5,171,005 also describes a device and a method for composing newspapers. The device includes a plurality of feed stations and a delivery station, wherein in each case a filling shaft for receiving printed products as a stack is assigned to the feed stations. Receiving compartments that are arranged on a circular rotating device are led along a closed circular path past the feed stations that are arranged circularly and sequentially along this circular path, as well as past the delivery station. The receiving compartments that are led past the feed stations are charged with newspaper parts from the associated filling shafts. The composed newspapers at the delivery station are delivered from the receiving compartments that run past, to a gripper conveyor.

In the case of a feed error, the rotation device undergoes an additional revolution, in order to lead the receiving compartment affected by the feed error back to the corresponding feed station and to correct the feed error. A sequence of different newspaper products, which is predefined for the later dispatch, can be retained in this manner.

Here too, the production of subsequent product units must be interrupted until the sequence, which is led in the rotation device, is completed and can be fed to a conveying-away device.

EP-A 0 511 159 moreover describes a method as well as a corresponding device that serves for composing complex product units by way of inserting part-products into a main product. Thereby, different products that are fed as continuous streams are led together along at least one grouping stretch (grouping section), realised by a belt conveyor, into groups. Each group is to have a predefined sequence of products. In order to avoid errors in the deposited product stream due to errors in the feed, it is suggested to buffer the products while still in the feed streams, e.g. by way of suitable intermediate conveyors, before delivery to a grouping stretch. The delivery is not to be effected until an adequate number of products for creating a complete group is present in all buffers. As the case may be, the creation of a group is delayed until this is the case.

This method however only remedies an error source that leads to faulty product units. Basically, however, there are a plurality of reasons as to why a product unit is not composed or only in a faulty manner.

U.S. Pat. No. 5,547,175 describes a method for creating individualised product units from several products, which are aggregated (grouped together) in each case into a stack. The device incudes two printing stations that are controlled by a common control device. Individual products can be provided with personalised messages at a first printing station, and the product unit can be provided with a personal address at a second printing station. However, no solution as to how sequences of product units with faulty product units can be repaired without a production interruption and while retaining the predefined sequence are mentioned in the mentioned publication document.

SUMMARY OF THE INVENTION

It is an object of the invention, to provide a method and a device for creating a product stream of a plurality of product units in a predefined sequence, by way of which faulty product units of a sequence can be corrected without an interruption of the production and while retaining the predefined sequence.

A sequence is to be understood as a predefined succession of product units, which, for example, are arranged one after the other along a conveying stretch in a certain sequence. Thus, a certain place or a certain position in the sequence is assigned to the individual product units.

The sequence can have any length. The sequence can consist of part-sequences that differ from other part-sequences by way of certain features, such as, for example, mailing region or mailing route.

The method for creating a cycled product stream of product units in a predefined sequence includes the following steps:

feeding products to the grouping stretch of a first conveying device;

creating a cycled product stream of product units from the fed products, along the grouping stretch in a predefined sequence, transfer of the product units in the predefined sequence to a conveying-away device and conveying away the product units in a cycled product stream.

With regard to the product units, in each case it can be the case of individual or several, in particular different products, which are aggregated into the product unit. The products, for example, can be aggregated into stacks or inserted into other products. A combination of these is likewise conceivable.

With regard to the products, it is preferably the case of flat products such as letters or printed products. Printed products can, for example, be newspapers, magazines, periodicals, pamphlets, books, advertising supplements or flyers.

The product units can preferably be differentiated from one another, individualised or identifiable by person. The product units, for example, can be distinguishable from one another by an addressing, marking or by a different composition.

The product units are preferably individualised and for example are assigned to a certain recipient or to a certain recipient address. Individualised product units are thus to be understood as product units that include features specific to the recipient, such as address or products.

The individualised product units can accordingly be identified and assigned to the recipient by way of a control device of the device.

Individual products of a product unit, such as letters, newspapers or magazines can be addressed separately. Other products of a product unit, such as advertising supplements can be matched to the personal requirements of the recipient. For this reason, the individual product units of a sequence not only can differ from one another with regard to recipient address, but also with regard to contents.

The recipient of the product units, for example, can be people. It is also conceivable for the recipient to merely be a delivery address to a distribution location, from where the products of the product units are then processed further or distributed.

According to the invention, now with the occurrence of a faulty or missing products unit in the formed sequence, a product gap is formed in the product stream at the location envisaged for the missing or faulty product unit, in the conveying-away device.

The mentioned conveying stretch section of the conveying-away device is preferably arranged on the conveying-away device between a first take-over location and a second take-over location arranged downstream in the conveying direction. All or only the correctly created product units are taken over by the conveying-away device at the first take-over location, depending on the embodiment of the invention. The belatedly correctly created product units are taken over by the conveying-away device or taken over again, at the second receiving location.

The bridging device, for example, can be arranged between the first and the second take-over location.

According to a preferred first development of the method according to the invention, with regard to the transfer of faulty product units, a faulty product unit is not transferred to the conveying-away device. This means that the conveying means of the conveying-away device, which forms the product gap, is not occupied by a product unit.

Product gap means that a product unit is missing in the predefined sequence of product units, since, for example, the product unit concerned was kept back on further conveying or was previously discharged. A sequence of product units can comprise one or more, for example, directly consecutive product gaps.

With the conveying-away device the product gap manifest itself in that with regard to the conveying means that convey the product stream, one of the conveying means has no product unit.

Thus, a product gap is formed in the product stream for the missing product unit, in the conveying-away device. According to a first further development of the method according to the invention, the conveying means that are envisaged for the missing product unit is left empty in the sequence, on transfer of the product units to the conveying-away device.

According to a second further development of the method according to the invention, with regard to the transfer of faulty product units, although a faulty product unit is transferred to the conveying-away device, the faulty product unit, however, is subsequently discharged out of the product stream of the conveying-away device via a discharging device, for the purpose of forming a product gap.

It can also occur that a product stream has several product gaps that are directly subsequent to one another or are distanced to one another. Accordingly, several conveying means arranged directly subsequent to one another or in a manner distanced to one another can comprise no product units, in the conveying-away device.

Missing or faulty product unit can mean that the product unit is not formed at all or only incompletely formed. Thus, it can occur that in the grouping stretch, one or more products are not delivered for various reasons, and accordingly are absent in the product unit. This, for example, can occur if a gap occurs in the product feed as a result of a faulty processing.

Moreover, it can also occur that one or more fed products are damaged or are not correctly aligned to one another and these therefore either cannot be fed to the product unit or must be removed out of the product unit again.

Moreover, it can occur that one or more false products are fed to a product unit and must be removed from the product unit again.

The subsequent correction of the product unit can lie in individual products of the product unit, or the complete faulty product unit being discharged at a discharging station, and the product unit being completed or being completely created afresh.

The incomplete product unit can be fed again to the grouping stretch and completed if only products are missing in the product unit.

The missing or faulty product unit is thus belatedly correctly created in the grouping stretch and subsequently transferred to the conveying-away device.

The mentioned product unit now, however, is fed to the product gap temporally subsequently via a bridging device amid the bridging of a conveying stretch section of the conveying-away device. In this manner, the predefined sequence of product units are provided in the conveying-away device in a completely sorted succession for further processing procedures.

The conveying-away device can include a transfer conveying device as well as an intermediate conveying device. The transfer conveying device conveys the product units from the first conveying device to the intermediate conveying device. The conveying stretch section, which is to be bridged, and accordingly also the first and the second take-over locations are formed in the intermediate conveying device.

According to a first further development of the method according to the invention, with respect to the transfer of product units correctly created at a later time, the product unit correctly created at a later time is transferred from the first conveying device, for example, directly or indirectly via a transfer conveying device to a bridging device and from the bridging device transferred firstly to the conveying-away device or intermediate conveying device and fed to the product gap in the product stream on the conveying-away device or intermediate conveying device.

According to a second further development of the method according to the invention, with respect to the transfer of product units correctly created at a later time, the belatedly correctly created product unit is transferred from the first conveying device, for example, directly or indirectly via a transfer conveying device to a conveying-away device or intermediate conveying device and subsequently delivered from the conveying-away device or the intermediate conveying device to the bridging device.

The mentioned product unit is transferred via the bridging device, amid the bridging of a conveying stretch section of the conveying-away device or of intermediate conveying device, again to the conveying-away device or intermediate conveying device and fed to the product gap in the product stream on the conveying-away device or intermediate conveying device. The product unit correctly created at a later time is thus sorted into the sequence of product units which is formed beforehand.

This second further development of the method has the advantage that the product units, which are correctly created straightway as well as at a later time, which is to say belatedly, can be taken over from the conveying-away device at a common, first take-over location. Only subsequently are the product units correctly created at a later time discharged again out of the conveying-away device and transferred to the bridging device, as described above.

The sequence is preferably conveyed further before, during and/or after its completion in the conveying-away device. This means that the sequence or part-sequence is in constant movement in the conveying direction along its conveying path. A switching-off of the device or of individual devices of the device is not necessary.

The device for carrying out the method according to the invention comprises:

- a first conveying device with a grouping stretch for creating a cycled product stream of product units from the fed products, in a predefined sequence;
- a conveying-away device for conveying-away the product units in the predefined sequence in a cycled product stream.

A grouping stretch (section) generally is to be understood as a zone in the first conveying device, in which the product units are composed in a predefined sequence. Preferably, the grouping stretch includes a conveying stretch section in the first conveying device, along which section the product units are composed.

The conveying-device as already mentioned can include a transfer conveying device as well as an intermediate conveying device.

The transfer conveying device serves for taking over the product units from the first conveying device and for the transfer of the production units to the intermediate conveying device. For this, the product units are delivered to the transfer conveying device at a delivery location that is assigned to the first conveying device, and are taken over by an intermediate conveying device at a receiving location, which is assigned to this intermediate conveying device.

The transfer device for this preferably includes at least one intermediate conveyor that conveys the production units from the delivery location of the first conveying device to the take-over location on the intermediate conveying device and, as the case may be, to a bridging device. The intermediate conveyor can, for example, be a belt conveyor or a gripper conveyor or a combination thereof, or comprise these.

The device according to the invention includes a bridging device that is designed such that product units can be fed to the conveying-away device in a temporally successive manner amid the bridging of a conveying stretch section of the conveying-away device and thus be sorted into the previously formed sequence of product units which has a product gap.

The bridging device can also be indicated as a bypass device, sorting-in device or post-run device. The conveying path of a product unit fed to the conveying-away device in a temporally subsequent manner can be reduced with the help of the bridging device while leaving out conveying cycles. In this manner, the product unit can still reach a previously created sequence of product units, to which this product unit belongs, and be sorted into this.

For this, preferably a first and a second take-over location are provided on the conveying-away device or the intermediate conveying device, at which first and second take-over locations the product units can be taken over by the conveying-away device.

A first take-over location is designed to transfer the product units of a sequence, which are correctly composed straightaway, to a conveying-away device.

A second take-over location, which is arranged downstream of the first take-over location in the conveying direction, is designed to transfer belatedly correctly created product units to the conveying-away device or to the intermediate conveying device while bridging a conveying stretch section.

The bridgeable conveying stretch section lies between the first and the second take-over location. The conveying stretch section includes a plurality of conveying means that are each assigned to a conveying cycle.

The bridgeable conveying stretch section can be designed, for example, as an open loop. The direct distance of the two first and second take-over locations, which form the loop ends are shorter, in particular significantly shorter, than the length of the conveying stretch, which is formed by the loop.

If then a belatedly correctly created product unit is fed to the conveying-away device at the second take-over location, then the conveying cycles in the conveying stretch section lying therebetween are left out. The belatedly correctly created product unit reaches the product gap, which has arisen in the product stream, since the product units of a sequence that were correctly created straightaway and that were transferred to the conveying-away device at the first take-over location must run through this conveying stretch section.

The additional time, which is required for the belated creation of the product unit, can be compensated by that time which the product units which were correctly composed straightaway require, in order to run through the mentioned conveying stretch section.

If a transfer conveying device is provided, then this can be assigned to processing stations that carry out processing steps on the product units during their conveying through the transfer conveying device.

Thus, for example, an aggregating station can be provided, at which the loose products of the product units can be aggregated or grouped together into coherent product units. The aggregating station can, for example, be present in the form of a foiling or wrapping station, at which the product units are enveloped by a plastic wrapping.

Moreover, a lettering (labelling) station or print station can be provided, at which the product units are printed or marked (labelled). Thus, addresses and/or other information can be deposited onto the product units.

The first conveying device preferably includes a plurality of conveying means that are led in a closed circulating path. The conveying means, which are assigned in each case to a conveying cycle, each form a receiving section for creating and receiving the product units. The receiving section can, for example, be a pocket, a compartment, a gripper with extended gripper limbs, a saddle, an incision, a compartment, a recess, a hump or an inclined deposition surface with an abutment.

The first conveying device preferably also includes means for the clamped holding of the product units on the conveying means. Thus, the receiving sections can include grippers, clips or holding-down means, such as belts or spring elements, wherein these cooperate with a deposition surface. The spring elements are, for example, formed of spring steel. The holding-down means can also be brush strips arranged along the conveying direction, which with their bristles press against the product units.

The receiving sections can be designed arranged in an overlapping, imbricate or staggered manner or individually one after the other.

A grouping stretch is provided along the circulating path, along which stretch the products are transferred via one or more feed devices to the conveying means of the first conveying device amid the formation of product units.

The closed circulating path now permits a return guidance of the conveying means which, comprising the faulty or missing product units, to the grouping stretch. The product unit in the grouping stretch is then belatedly correctly created or collated afresh and subsequently, as already previously, the product units of the sequence which were correctly composed straightaway are transferred to the conveying-away device or via a transfer conveying device to an intermediate conveying device.

The device for this is controlled such that the belatedly created product unit via the bridging device is merged into the product gap in the product stream, the product gap having arisen in the conveying-away device due to this product unit.

The first conveying device is preferably part of a collating device for collating product units in the form of collections, along the grouping stretch. Such a collating device, as can be applied in the present invention, is disclosed for example in EP 2 107 023 A1. The contents of the mentioned publication document with regard to the collation device and in particular with regard to the receiving compartments is herewith adopted by reference and is valid as part of the disclosure.

The collating device in particular is characterised by a circulating path of the conveyor that includes two part-regions. The two part-regions are arranged over one another, wherein the grouping stretch is formed in an upper part region of the circulating path. The circulating path in the part-regions preferably runs horizontally or essentially horizontally.

One or a plurality of feed devices is arranged along the grouping stretch, via which feed devices the products are delivered to the conveying means moved along the grouping stretch.

The lower part region forms a return region. The upper and the lower part-region are connected to one another via a deflection that is at the front and a deflection that is at the rear, considered in the conveying direction along the grouping stretch. The conveying means are deflected or reversed from the upper part-region into the lower part-region, in the two deflections.

The product units, as shown in the subsequent embodiment examples, are preferably delivered or released at a deflection, to the conveying-away device or to a transfer conveying device.

WO 2010/051651 A2 describes a particular embodiment of the collating device described above, as can likewise be applied in the present invention. The contents of the mentioned publication document, with regard to the collating device and in particular with regard to the receiving compartments are incorporated herein by reference and is valid as part of the disclosure.

The collating device according to the mentioned publication document in particular is characterised in that the conveying means are designed as receiving units with a rest surface for the products, the rest surface being obliquely inclined. The receiving units moreover comprise grippers with a first and a second gripper jaw, by way of which the product units can be gripped and held.

A comparable collation device is also described in EP 2 383 214 A1. The contents of the mentioned publication document, with regard to the collating device and in particular with regard to the receiving compartments is incorporated herein by reference and is valid as part of the disclosure.

The conveying means according to the embodiment variants mentioned above and which are designed as receiving units are each moved along the circulating path via a conveying chain.

The conveying-away device or the intermediate conveying device preferably likewise includes a plurality of conveying means, wherein preferably in each case a conveying means is provided for a product unit. A conveying cycle is assigned to each conveying means. The conveying-away device or intermediate conveying device can, for example, include a gripper conveyor. The conveying means in this case correspond to the grippers that are conveyed individually and one after the other along a conveying stretch or section.

According to a further development of the invention, the number of the conveying cycles predefined by the conveying means, in the conveying stretch section of the conveying-away device or of the intermediate conveying device corresponds at least to the number of conveying cycles along the closed circulating path of the first conveying device.

According to a first embodiment of the device according to the invention, the conveying-away device as already explained above includes a transfer conveying device and an intermediate conveying device. The bridging device is arranged downstream of the transfer conveying device in the process direction. Moreover, a diverter device is provided, which selectively permits the product units of a sequence that are correctly composed straightaway to be fed to the first take-over location and to be transferred there to the intermediate conveying device, and belatedly correctly created product units to be fed via the bridging device to the second take-over location and to be transferred there to the intermediate conveying device.

The term "diverter device" is to be broadly interpreted and is to include any type of devices that permit a product unit that is gripped by the transfer conveying device to be selectively fed to a first or second take-over location of the intermediate conveying device. The diverter device is controllable via a suitable control device.

The intermediate conveying device as well as the bridging device, which is arranged downstream, including the diverter device can be designed according to the transfer device as is disclosed in WO 2009/065242 A1. The contents of the mentioned publication document with regard to the transfer device is hereby incorporated herein by reference and is valid as part of the disclosure.

According to the publication document mentioned above, the grippers of the intermediate conveying device are deflected in a preferably downwardly directed deflection. The deflection can, for example, include a deflection of the conveying path by 90° (angle degrees) or more, in particular by 180°.

The deflection, for example, has the task of feeding the product stream into a conveying-away loop or out of this.

The conveying means such as, for example, grippers are preferably conveyed in an arch, in the deflection. This leads to the effect that the distances of the radially outwardly lying product gripping sections such as gripper limbs of the conveying means increase in the deflection.

An intermediate conveyor of the transfer conveying device, which in particular is a belt conveyor, now feeds all product units delivered from the first conveying device to the deflection of the intermediate conveying device. The grippers include gripper limbs that are pivotable relative to one another between an open and closed position via a control device. Moreover, preferably the grippers are also pivotable via the control device. The pivoting of the grippers as well as of the gripper parts can be effected, for example, via cam guides.

The gripper or the gripper limbs, on account of the position of the gripper limbs relative to one another and/or by way of the pivoting of the grippers, at the first take-over location can now be brought into a position, in which they take-over or reject a product unit fed from the intermediate conveyor.

Rejected product units are fed to the bridging device arranged downstream, in particular to a belt conveyor of the bridging device.

The feeding of the product units to the conveying means, in particular to the grippers of the intermediate conveying means at the second take-over location can be effected by way of a double belt conveyor, as is described for example in EP 1 411 011 B1. The contents of the mentioned publication document with regard to the double belt conveying device is incorporated herein by reference and is valid as part of the disclosure.

Here too, the grippers are deflected at a preferably downwardly directed deflection. The deflection can, for example, include a deflection of the conveying path by 90° (angle degrees) or more, in particular by 180°.

The production units are conveyed via the double belt conveying device, from the bottom to the top to the grippers circulating about the deflection and are transferred to these.

The product units are fed to the double belt conveying device individually, which is to say in a singularised manner, via a belt conveyor, and are deflected upwards around 90° into a vertical alignment by the double belt conveying device.

The point in time of the product delivery or release can be controlled via the drive of the double belt conveying device. The product units can thus be held back in the double belt conveying device until the arrival of the product gap. Accordingly, the double belt conveying device can likewise be controlled via the control device.

According to a second embodiment of the device according to the invention, the bridging device is arranged between a delivery location on the first conveying means and a second take-over location of the conveying-away device.

Here too, the device can include a transfer conveying device, which at a first delivery location takes over the product units correctly composed straightaway, from the first conveying device and transfers these at a first take-over location to an intermediate conveying device. The bridging device at the first or at the second delivery location takes over the belatedly correctly created product units, from the first conveying device and brings these at a second take-over location of the intermediate conveying device.

The bridging device preferably includes an intermediate conveyor. The intermediate conveyor conveys the product units from the first or second delivery location of the first conveying device to the second take-over location on the intermediate conveying device. The intermediate conveyor can, for example, be a belt conveyor or a gripper conveyor or a combination thereof or comprise these.

Here too, a bridgeable conveying stretch section lies between the first and the second take-over location. The conveying stretch section includes a plurality of conveying means that are each assigned to a conveying cycle. Here too, the bridgeable conveying stretch section can be designed, for example, as an open loop of the already described type.

According to a third embodiment of the device according to the invention, the bridging device is arranged between a first and a second transfer location on the conveying-away or intermediate conveying device. The conveying stretch section of the conveying-away device, which is to be bridged, lies between the two transfer locations. The first transfer location is designed for the transfer of belatedly correctly created product units from the conveying-away device or intermediate conveying device to the bridging device.

The second transfer location is designed for the delivery of the belatedly correctly created product units to the conveying-away or intermediate conveying device and for sorting these product units into the product gap. This embodiment is applied in the method according to the second further development with regard to the transfer of belatedly created product units.

The bridging device can include means for buffering the product units. The means, for example, can include a double-belt conveying device.

The device preferably also includes a control device for the control of the method steps according to the invention. These method steps are:

a. the creation of product units in a predefined sequence and the transfer of the product units to the conveying-away device;

b. the belated creation of product units, c. the generation of product gaps in the product stream of the conveying-away device, and d. the cyclically synchronous feeding of belatedly created product units into the product gaps on the conveying-away device.

The creation of the product units as well as the formation of the product stream formed from consecutive product units are preferably monitored by the control device. A digital cycle picture of the device is preferably produced in the control device for this. The cycle image permits the assignment of the product units to the conveying means as well as the tracking of the product units conveyed along the conveying stretch by way of the conveying means. Thanks to this monitoring, it is possible to sort belatedly correctly produced product units into the envisaged product gaps of a product stream in the conveying-away device in a targeted manner.

The speeds of the individual conveying devices (including intermediate conveyor) as well as any occurring buffering of the belatedly produced product units can be controlled such that the belatedly produced product unit is fed at the point in time, at which the product gap passes the second take-over.

Thus, for example, one can also envisage the belatedly produced product unit being fed to the bridging device and being kept back in this bridging device by way of the buffering until the product gap reaches the second take-over location.

The device preferably includes for the control of the procedures, and these sensors, for example, record product-specific information or detect irregularities on product processing and lead these further to the control device. The sensor information, for example, can be the wrong address or a damaged product. The control device due to the evaluated sensor information initiates the necessary method steps for the completion or creation of a product unit that was not successfully produced, the completion or creation being effected belatedly.

The method according to the invention as well as the associated device have the advantage that faulty or missing product units can be belatedly completed or post-produced and temporary subsequently and at the correct locations be sorted or cycled into sequence of product units that are already delivered to the conveying-away device, in a positionally accurate manner.

The belated completion of product units of an already produced sequence section that has been transferred to the conveying-away device, however, does not block the continuous creation of further product units of subsequent sequence sections.

The device as the case may be can even be operated with the maximal operating speed, independently of whether faulty product units have to be belatedly corrected.

With the introduction of belatedly created product units by the bridging device, although it can be the case, that a product gap is formed at the first take-over location and continues to move by way of the conveying-away device, this produce gap, however, is insignificant for subsequent processing steps. What is decisive is the fact that the predefined sequence succession can be maintained.

The device according to the invention, for carrying out the method also has the advantage that the invention can be implemented with little design effort. Thus, existing devices can also still be retrofitted. Moreover, the implementation of the invention with regard to control technology is comparatively simple. The control of the device remains simple and clear even with the method according to the invention.

Also less manual post-work such as, for example, post-sorting and placing of post-produced product units into the product gaps of previously manufactured sequences of product units by hand, is necessary due to the comparatively low complexity of the method according to the invention and of the associated device.

The device according to the invention has a compact construction manner and assumes little space.

A further advantage lies in the fact that the method according to the invention together with the control and the associated device can be easily understood and can be grasped by less trained or skilled personnel. This permits a safe operation of the device.

BRIEF DESCRIPTION OF THE DRAWINGS

The subject-matter of the invention is hereinafter described by way of preferred embodiment examples which are represented in the accompanying drawings. In each case are shown schematically in.

DETAILED DESCRIPTION OF THE INVENTION

Figure 1:
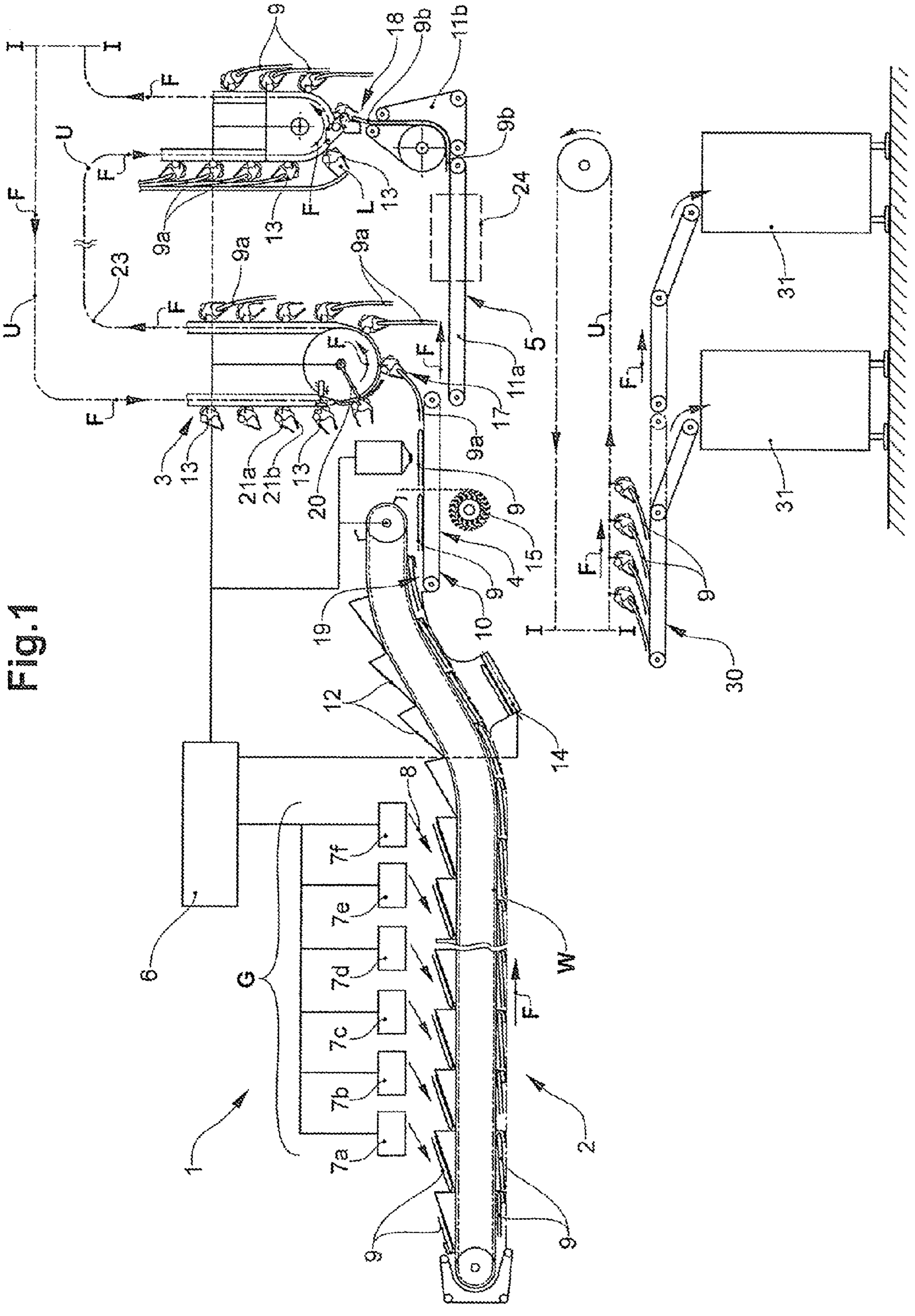
FIG. 1: a lateral view of a first embodiment of a device according to the invention.

Basically, the same parts are provided with the same reference numerals in the figures.

The two embodiments of a device 1, 51 according to the invention each include a collating device with a first conveying device 2, 52 for collating products 8 into product units 9. The first conveying device 2, 52 has a plurality of conveying means 12 in the form of receiving sections, which are arranged one after the other. The conveying means 12 are led in a circulating manner along a closed conveying path W. The conveying means 12 can, for example, be led via a conveying chain (not shown). The receiving sections 12 each include a deposition surface as well as a holding-down means, which cooperates with the deposition surface and by way of which the product unit 9 can be held on the deposition surfaces.

The circulating path W forms an upper and a lower part-region. A grouping stretch G is formed in the upper part region. A plurality of feed units 7*a*-7*f*, 56*a*-56*e* are arranged along the grouping stretch G and are configured to deliver the products 8 to the receiving sections 12, which are conveyed part the grouping stretch G. The receiving sections 12 for this are led along the grouping stretch G past the feed units 7*a*-7*f*, 56*a*-56*f*.

The created product units 9 subsequently to the grouping stretch G are deflected via a deflection, which is at the front considered in a conveying direction F along the grouping stretch G, into the lower part-region and are conveyed to a rear deflection of the conveying device 2, 52. The product units 9 thereby are transferred at a delivery location 19, 69, 70, which is arranged downstream of the grouping stretch in the conveying direction F, to a transfer conveying device 4, 54, 60.

The empty receiving sections 12 again redeflected via the rear deflection and are led back into the upper part-region, where they are then moved afresh along the grouping stretch G for the purpose of creating further product units 9.

The device 1, 51 further includes a conveying-away device. The conveying-away device, amongst other things, includes an intermediate conveying device 3, 53 in the form of a gripper conveyor with a plurality of grippers 13. The intermediate conveying device 3, 53 conveys the product units 9 from the first conveying device 2, 52 to a further processing.

The take-over of the product units 9 by the intermediate conveying device 3, 53 at the take-over locations 17, 18; 67, 68 is effected in each case by way of closure of the grippers 13. This procedure is controlled by way of suitable guide mechanisms. The guide mechanisms, in turn, are controlled by a control device 6, 55.

The device 1, 51 moreover includes a central control device 6, 55, by way of which, amongst other things, the feed units 7*a*-7*f*, 56*a*-56*e*, further processing stations such as, for example, an aggregating station 15, 65 and a lettering station 16, 62, the delivery of the product units 9 at the delivery locations 19, 69, 70, the take-over of the product units 9 at the take-over locations 17, 18; 67, 68, including the diverter device 20, as well as the discharge station 14 can be controlled in a coordinated manner.

The control device 6, 55 maintains a digital cycle image of the device 1, 51. This permits the assignment of the product units 9 to the individual conveying means 12, 13 such as grippers, as well as the tracking of the product units 9, which are conveyed along the conveying stretch or path by way of the conveying means 12, 13. The control device 6, 55 therefore knows, for example, the condition of the grippers 13 of the intermediate conveying device 3, 53, i.e. whether these are empty or occupied by product units 9. The product units are preferably individualised.

According to the first embodiment shown in FIG. 1, the product units 9 of the first conveying device 2, at the delivery location 19 are delivered individually to a belt conveyor 10 of the transfer conveying device 4, which is likewise part of the conveying-away device. The delivery location 19 is arranged in the lower part-region of the circulating path W, which ends in the rear deflection.

Processing stations, past which the product units 9 are conveyed 9, are arranged along the belt conveyor 10. A first processing station includes an aggregating station 15, at which the loose products 8 of the product units 9 are aggregated or grouped into coherent product units 9. The product units 9 at a subsequent lettering station 16 are addressed and/or provided with other information.

The product units 9 at a first take-over location 17 are subsequently transferred to the grippers 13 of an intermediate conveying device 3. The exact procedure of the take-over of the product units 9 by the intermediate conveying device 3 is described in a detailed manner below by way of FIGS. 2*a* to 2*c*.

If now the control device 6 ascertains that a receiving section 12 of the first conveying device includes a faulty product unit 9*c* or this is completely missing, then the receiving section 12 concerned is led past the delivery location 19 without delivery the faulty product unit, back into the grouping stretch G. A faulty product unit 9*c* ^, as the case may be, can be automatically discharged out of the processing process at a discharging station 14 arranged in the lower part region of the circulating path W.

The gripper 13 on the intermediate conveying device 3 and which is envisaged for gripping the product unit 9*c*, which has been ascertained as being faulty, with the take-over of the product units 9*a* correctly composed straightaway accordingly remains empty and forms a product gap L.

The faulty product unit 9*c* is now belatedly completed or is created afresh. Thus, for example, the still missing products 8 in the grouping stretch G are fed to the receiving section 12, which comprises the faulty product unit 9*c*.

If the mentioned receiving section 12 is empty when being led back, for example, since no product unit 9 at all was created contradictory to the settings, or since the faulty product unit 9*c* was discharged at the discharging station 14 on leading back the receiving section 12, then the product unit 9*b* in the mentioned receiving section 12 is formed completely afresh on running through the grouping stretch G.

Alternatively, in the later case, the belatedly created product unit 9*b* can be created in any, but empty receiving section 12. This means that the belated creation of the product unit 9*b* does not need to be effected in that receiving section 12, to which the discharged or missing product unit was assigned. These two alternative procedural manners, moreover, are not limited to the present embodiment example but are very generally applicable.

The belatedly created product unit 9*b* now at the same delivery location 19*b* is likewise transferred to the belt conveyor 10 of the transfer conveying device, and as was already previously the case, the other product units 9 of the sequence concerned are collated into coherent product units 9*b* and are lettered.

A diverter device 20 is now assigned to the intermediate conveying device 3, in the region of the first transfer location 17, by way of which diverter the position of the grippers 13 as well as the position of the gripper jaws 21*a*, 21*b* relative to one another can be controlled such that the grippers 13 with their gripper jaws 21*a*, 21*b* either grip and take-over the product units 9 fed via the belt conveyor 10 or laterally reject then and do not take them over.

The belatedly created product unit 9*b* is likewise fed on the belt conveyor 10 to the first take-over location 17. The diverter device 20 now is controlled via the control device 6 in a manner such that the gripper 13 arriving simultaneously in the conveying cycle of the belatedly created product unit 9*b*, by way of a pivot movement, rejects the product unit 9*b* and by way of this does adopt this, which is to say take it over.

The mentioned product unit 9*b* by way of this is guided onto a further belt conveyor 11*a* of the bridging device 5. The product unit 9*b* in this manner amid the bridging of a conveying stretch section of the intermediate conveying device 3 is deflected by way of a double belt conveying device 11*b* connecting to the belt conveyor 11*a*, into a vertical direction and is fed from below to a second take-over location 18 on the intermediate conveying device 3.

The bridging device 5 moreover includes means 24 for buffering, thus for holding back the product units 9*b* until the point in time of the delivery, in the form of a double belt conveying device.

The second take-over location 18 in the conveying direction F of the intermediate conveying device 3 is arranged downstream of the first take-over location 17. A conveying stretch section which forms a plurality of grippers 13 assigned to a conveying cycle in each case is formed between the first and the second take-over location. The post-produced product unit 9*b* now leads the product units 9*a*, which are conveyed in the conveying stretch section.

The product unit 9*b* is now inserted into the empty gripper 13. The empty gripper was already previously formed by way of the faulty product unit 9*c* not being taken over.

Of course, the belt conveyor 11*b* can also deflect the product units 9*b* only by an angle of up to 30° to the vertical.

The conveying stretch section formed between the two take-over locations 17, 18 is designed as an open conveying-away loop 23. In other words, the length of the conveying stretch section is significantly greater than the distance between the two take-over locations 17, 18.

The intermediate conveying device 3 at the two take-over locations 17, 18 in each case forms a downwardly pointing deflection, about which the grippers 13 are led by 180°. The grippers 13, which are preferably led on a conveying chain (not shown), are thus conveyed to the deflection from the top to the bottom, deflected and conveyed again from the bottom to the top. The circulating path U of the grippers 13 forms a U-shaped conveying section.

The take-over of the product units 9 takes place in the deflection in each case. In this conveying section, the receiving regions of the grippers 13 are mutually moved apart due to the arched deflection, so that greater distances arise between the receiving regions of the individual grippers 13, and these larger distances permit a reliable transfer of the product units 9. This also relates to the take-over locations 67, 68 according to the embodiment example according to FIG. 3.

Whereas the product units 9 at the first take-over location 17 are now conveyed horizontally and tangentially to the deflection to the first take-over location 17, the product units 9*b* at second take-over location 18 are fed vertically from below. It is advantageous with this type of conveying if the product units 9 are fed to the grippers 13 in a manner clamped between the two belts of the double belt conveying device 11*b*.

The product units 9 at a delivery location can be fed from the intermediate conveying device 3 to a further processing. Thus the product units 9 can be delivered to a belt conveyor 30 and be fed on the belt conveyor 30 one after the other or in an imbricate stream, but still in the predefined sequence, to a stacking device 31. The product units 9 are aggregated in the stacking device 31, e.g. into stacks or packs, and bound.

Figure 2C:
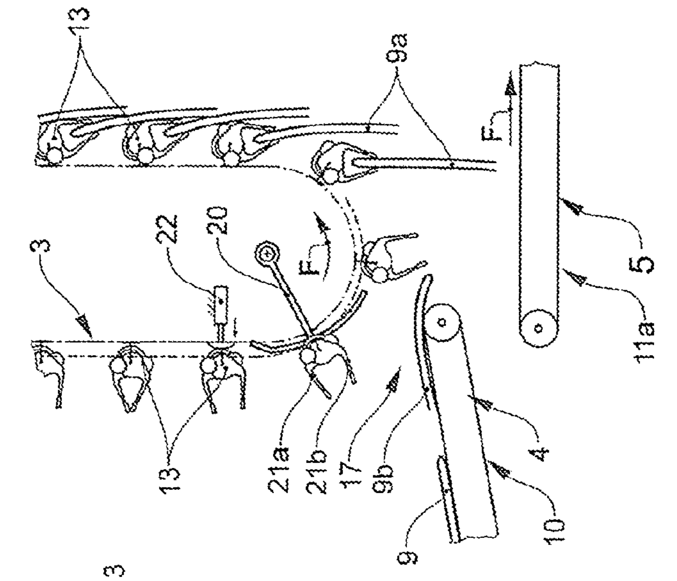
FIG. 2*a*-2*c*: lateral views of details of the first take-over location according to FIG. 1.
Figure 2B:
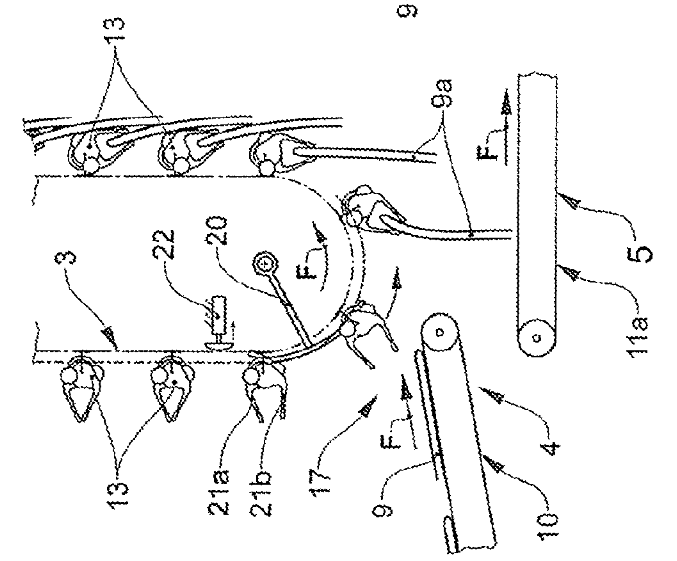
Figure 2A:
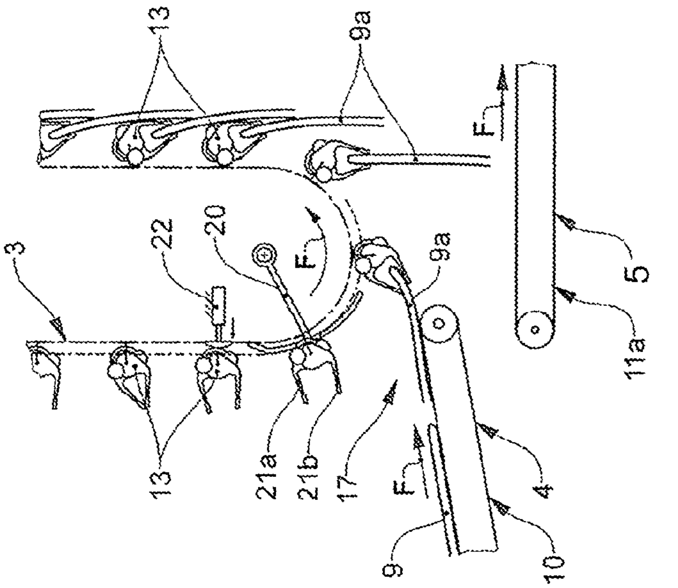

FIGS. 2*a* to 2*c* show details of the first take-over location 17. The intermediate conveying device 3 in front of the first take-over location 17 include an opening assembly 22 for opening the grippers 13. The opening assembly 22 ensures that the grippers 13 run into the take-over location 17 in an opened manner.

Moreover, the intermediate conveying device 3 in the region of the first take-over location 17 also comprises a controllable guide mechanism 20, by way of which the pivot angle of the gripper 13 and the closure of the gripper 13 can be controlled. The pivot angle of the gripper 13 at the take-over location 17 is co-decisive as to whether the product unit 9 is inserted into the open gripper jaw 13 or is not received due to the pivoting of the gripper limbs 21*a*, 21*b* or the non-closure of the gripper 13. Accordingly, the mentioned guide mechanism is part of a diverter device 20.

If the product unit 9*b* is rejected by the gripper 13, then this product unit is conveyed in the conveying direction F from the belt conveyor 10 of the intermediate conveying device 4 onto the belt conveyor 11*a* of the bridging device 5, which lies at a lower or at the same level. The belt conveyor 11*a* conveys the product unit 9*b* to the second take-over location 18. The product units 9 are conveyed on the belt conveyors 10, 11*a* in each case in a singular manner. Of course, the mentioned belt conveyors can also have an inclination of, for example, up to 30°.

Figure 3:
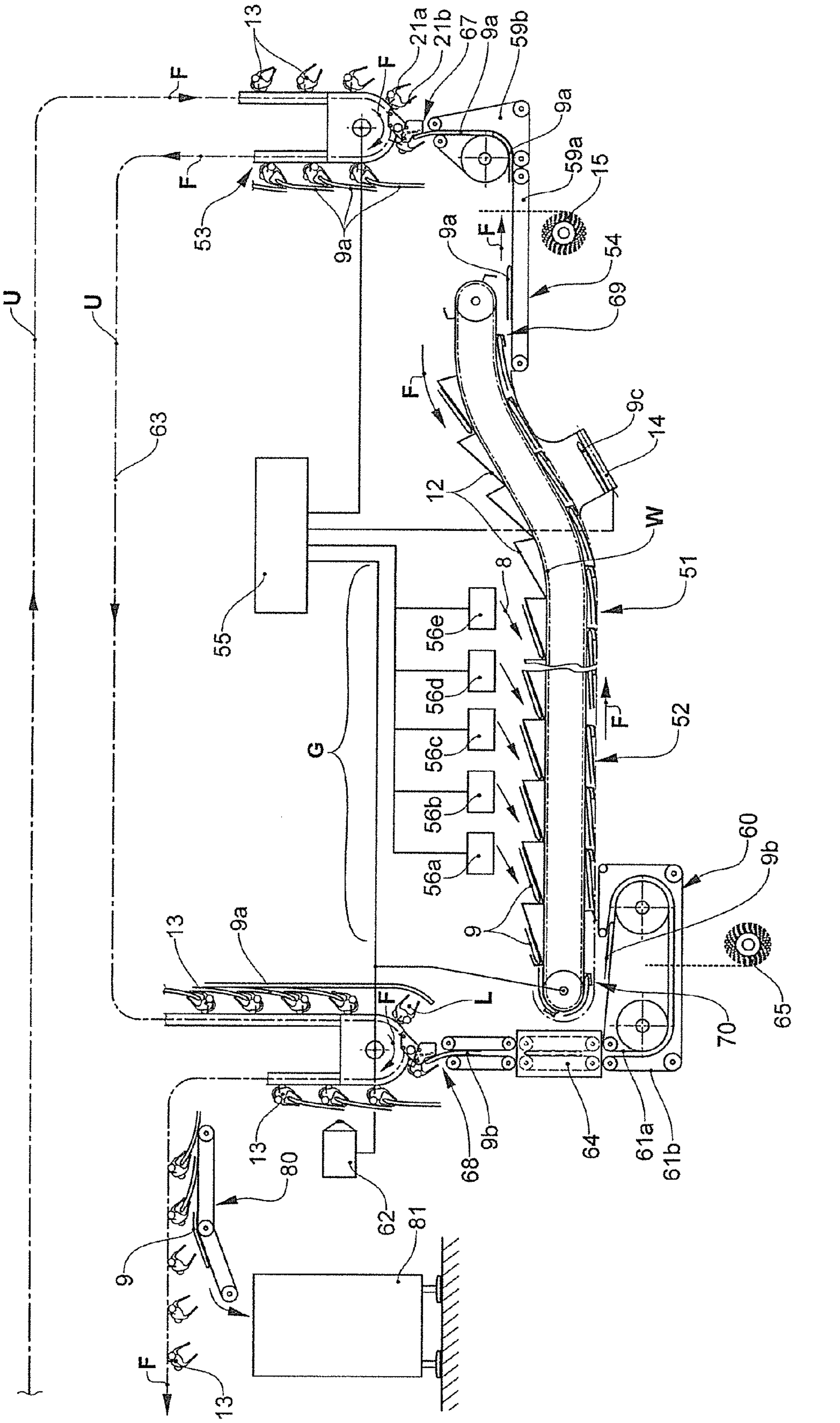
FIG. 3 a lateral view of a second embodiment of a device according to the invention.

The second embodiment of a device 51 according to the invention and which is represented in FIG. 3, as already mentioned above likewise includes a collating device with a first conveying device 52.

In contrast to the first embodiment, this embodiment, considered along the grouping stretch G in the conveying direction F, apart from a transfer conveying device 54 arranged on the rear deflection of the first conveying device 52, includes a bridging device 60 arranged at the front deflection.

The transfer conveying device 54 is designed in order, at a first delivery location 69, to accept the product units 9 of a sequence that are correctly compose straightaway, from the first conveying device 52 and to transfer these at a first take-over location 67 to the intermediate conveying device 53.

For this, the product units 9 at the first delivery location 69 are delivered from the first conveying device 52 onto a belt conveyor 59*a* of the transport conveying device 54. The first delivery location 69 is arranged in the lower part-region of the circulating path W, which runs into the rear deflection.

The product units 9*a* are led with the belt conveyor 59*a* past an aggregating station 15, at which the loose products 8 of the product units 9*a* are aggregated into coherent product units 9*a*.

A double belt conveying device 59*b* connects to the belt conveyor 59*a* and this deflects the product units 9*a* from a horizontal position upwards into a vertical position and from below feeds them to grippers 13 of the intermediate conveying device 53 and transfers them to this.

The bridging device 60 further also comprises means 64 for buffering, thus for holding back the product units 9*b* until the point in time of delivery, and these means are in the form of a double belt conveying device.

The bridging device 60 is designed to accept the belatedly created product units 9*b* of a sequence from the first conveying device 52, at a second delivery location 70 and to transfer these to the intermediate conveying device 53 at a second take-over location 68.

The second take-over location 68 in the conveying direction F of the intermediate conveying device 53 is arranged downstream of the first take-over location 67. A conveying stretch section, which comprises a plurality of grippers 13 assigned in each case to a conveying cycle, is formed between the first and the second take-over location 67, 68.

The conveying stretch section formed between the two take-over locations 67, 68 here is also designed as an open conveying-away loop 63. In other words, the length of the conveying stretch section is significantly greater than the distance between the two take-over locations 67, 68. Hereby, the bridging device can be operated with the same speed as the transfer conveying device.

The belatedly created product units 9*b* are now transferred from the first conveying device 52 at the second delivery location 70 onto a belt conveyor 61*a* of the bridging device 60. The second delivery location 70 is arranged in the lower part region of the circulating path W, which begins in the front deflection.

A double belt conveying device 61*b*, which deflects the product units 9*b* upwards into a vertical position, connects to the belt conveyor 61*a*.

The loose products 8 of the product units 9*b* are likewise aggregated at an aggregating station 65 into coherent product units 9*b* and subsequently are fed from the bottom to the top to the grippers 13 of the conveying-away device 53 and are transferred to these, which is to say, are taken over by these.

Here too, the intermediate conveying device 53 at the two take-over locations 67, 68 in each case forms a downwardly pointing deflection, about which the grippers are led by 180°. The grippers 13, which are preferably led on a conveying chain (not shown), are thus conveyed to the deflection from the top to the bottom, deflected and conveyed again from the bottom to the top. The circulating path U of the grippers 13 thus forms a type of U-shaped conveying section. The take-over of the product units 9 takes place in the deflection in each case.

The additionally required time for the post-production, which is to say belated completion of the faulty product unit 9*c*, here too, amongst other things is made good by the bridging of the conveying stretch section at the intermediate conveying device 53.

Since the second delivery location 70 lies upstream of the first delivery location 69 considered in the conveying direction, moreover a part of the additionally required time is made good on account of the earlier delivery of the belatedly created product units 9*b* by way of the bridging of the conveying stretch section between the two delivery locations 69, 70 at the first conveying device 52.

A lettering station 62 is moreover assigned to the intermediate conveying device 53. The lettering station or marking station 62 considered in the conveying direction F of the intermediate conveying device 53 is arranged downstream of the second take-over location 68. All product units 9 are led past a common lettering station 62 and are inscribed with the address and/or other information by way of this.

Of course, the mentioned belt conveyor 59*a*, 61*a* can also have an inclination of up to 30° to a vertical. Moreover, the double belt conveying devices 59*b*, 61*b* can also deflect the product units merely by an angle of up to 30° to a vertical.

The product units 9 at a delivery location can be fed from the intermediate conveying device 53 to a further processing. Thus, the product units can be delivered to a belt conveyor 80, and on the belt conveyor, one after the other or with an imbricate stream, but still in the predefined sequence, can be fed to a stacking device 81. The product units 9 are aggregated in the stacking device 81, for example, into stacks or packets and bound.

The invention claimed is:

1. A method for creating a cycled product stream of product units in a predefined sequence, comprising the following steps:

feeding of products to a grouping stretch of a first conveying device;

creating a cycled product stream of product units from the fed products along the grouping stretch in a predefined sequence;

transferring the product units in the predefined sequence to a conveying-away device and conveying away the product units in a cycled product stream, wherein the product units are conveyed to a first take-over location, and the product units correctly created straightaway are taken over at the first take-over location by the conveying-away device, wherein with the occurrence of a faulty or missing product unit in the formed sequence of product units, a product gap is formed in the product stream in the conveying-away device at the location envisaged for the missing or faulty product unit, and the faulty or missing product unit, in a temporally subsequent manner is corrected or post-produced along the grouping stretch and via a bridging device is conveyed to a second take-over location, wherein the bridging device is arranged between the first and second take-over locations and the second take-over location is arranged downstream in the conveying direction, and belatedly correctly created product units are taken over at the second take-over location by the conveying-away device and fed to the product gap amid the bridging of a conveying stretch section of the conveying-away device arranged between the first take-over location and the second take-over location and thus is sorted into the previously formed sequence of product units.

2. The method according to claim 1, wherein a faulty product unit is not transferred to the conveying-away device, amid the formation of a product gap.

3. The method according to claim 1, wherein a transfer conveying device is provided, and the bridging device is arranged downstream of the transfer conveying device, and the production units are transferred to the transfer conveying device and are fed to a first take-over location, wherein a diverter device is provided, by way of which the belatedly created product units are fed from the first take-over location via the bridging device to a second take-over location of the conveying-away device.

4. The method according to claim 1, wherein the product units that are correctly created straightaway are delivered at a first delivery location to the first conveying device and at a first take-over location are transferred to the conveying-away device, and the belatedly correctly created product units at the first or at a second delivery location on the first conveying device are delivered to a bridging device and are conveyed to a second take-over location and are transferred to the conveying-away device.

5. The method according to claim 1, wherein the first conveying device comprises conveyor led in a closed circulating path, for creating and receiving the product units, and the conveyor that comprises the missing or faulty product unit is led back to the grouping stretch, and the product unit is belatedly correctly created and is subsequently transferred to the conveying-away device.

6. The method according to claim 1, wherein a faulty product unit, in particular at a first take-over location, is transferred to the conveying-away device, and the faulty product unit for the purpose of forming a product gap is subsequently discharged out of the product stream in the conveying-away device.

7. The method according to claim 1, wherein the belatedly correctly created product unit:

is transferred to the conveying-away device, in particular at the first take-over location, is delivered from the conveying-away device to a bridging device;

is transferred from the bridging device, in particular at the second take-over location, again to the conveying away device amid the bridging of a conveying stretch section of the conveying-away device, and is sorted into the product gap in the conveying stream.

8. A device for creating a product stream of product units according to the method of claim 1, comprising:

a first conveying device with a grouping stretch for creating a cycled product stream of product units from fed products, in a predefined sequence;

a conveying-away device for conveying away the product units in the predefined sequence in a cycled product stream;

wherein the device comprises a bridging device that is designed such that belatedly created product units amid the bridging of a conveying stretch section can be led to the conveying-away device in a temporally subsequent manner and thus be sorted into the sequence of product units that is formed previously and which has a product gap;

wherein the conveying-away device comprises a first take-over location for receiving the product units correctly created straightway and a second take-over location for receiving the belatedly correctly created product units, said second take-over location being arranged downstream of the first take-over location in the conveying direction, and the conveying stretch section is arranged between the first and the second take-over location;

wherein the bridging device is arranged between the first and the second take-over location.

9. The device according to claim 8, wherein the conveying-away device comprises a transfer conveying device and an intermediate conveying device, and the bridging device is arranged downstream of the transfer conveying device, and a diverter device is provided, which selectively permits product units to be fed to a first take-over location and to be transferred to the intermediate conveying device or to be fed via the bridging device to a second take-over location and to be transferred to the intermediate conveying device.

10. The device according to claim 9, wherein the transfer conveying device comprises an intermediate conveyor, which is designed in order to convey the product units from a first delivery location on the first conveying device to a first take-over location on the intermediate conveying device or, as the case may be, to convey them to a bridging device.

11. The device according to claim 9, wherein the transfer conveying device and/or the bridging device comprises a structure for buffering the product units.

12. The device according to claim 8, wherein the bridging device is arranged between a delivery location on the first conveying device and the second take-over location of the conveying-away device.

13. The device according to claim 8, wherein the intermediate conveying device comprises a gripper conveyor with a multitude of grippers led one after the other along a conveying stretch.

14. The device according to claim 8, wherein the first conveying device is part of a collating device for collating product units in the form of collections of products, along the grouping stretch.

15. The device according to claim 8, comprising a control device for the control of the method steps according to claim 1.

* * * * *